(12) United States Patent
West

(10) Patent No.: US 7,055,700 B2
(45) Date of Patent: *Jun. 6, 2006

(54) BICYCLE RACK

(75) Inventor: Kent G. West, Barrington Hills, IL (US)

(73) Assignee: Colony Incorporated, Huntley, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/615,447

(22) Filed: Jul. 8, 2003

(65) Prior Publication Data

US 2004/0124159 A1    Jul. 1, 2004

Related U.S. Application Data

(60) Division of application No. 09/450,961, filed on Nov. 30, 1999, now Pat. No. 6,588,603, which is a continuation-in-part of application No. 08/905,302, filed on Aug. 1, 1997, now Pat. No. 5,992,645.

(51) Int. Cl.
*A47F 7/00* (2006.01)
(52) U.S. Cl. .......................................... 211/19; 211/20
(58) Field of Classification Search .................. 211/19, 211/20, 22, 23, 24, 87.01; 224/324
See application file for complete search history.

(56) References Cited

U.S. PATENT DOCUMENTS

| 529,939 | A | * | 11/1894 | Noderer | 211/20 |
|---|---|---|---|---|---|
| 595,891 | A | * | 12/1897 | Robertson | 211/20 |
| 3,116,836 | A | * | 1/1964 | McCauley | 211/21 |
| 3,355,028 | A | * | 11/1967 | Mork | 211/21 |
| 3,603,459 | A | * | 9/1971 | Erb | 211/20 |
| 3,912,139 | A | * | 10/1975 | Bowman | 410/3 |
| 4,629,104 | A | * | 12/1986 | Jacquet | 224/324 |
| 4,830,196 | A | * | 5/1989 | Csanady | 211/19 |
| 5,417,629 | A | * | 5/1995 | Phipps | 482/61 |
| 5,645,202 | A | * | 7/1997 | Kaloustian | 224/314 |
| 5,988,403 | A | * | 11/1999 | Robideau | 211/20 |
| 5,992,645 | A | * | 11/1999 | West | 211/19 |
| 6,588,603 | B1 | * | 7/2003 | West | 211/19 |

FOREIGN PATENT DOCUMENTS

| CH | 60086 | * | 10/1924 | 211/20 |
|---|---|---|---|---|
| CH | 212976 | * | 4/1941 | 211/22 |
| CH | 110527 | * | 3/1944 | 211/22 |
| CH | 281315 | * | 6/1952 | 211/20 |
| DE | 286604 | * | 4/1928 | 211/21 |
| DE | 216901 | * | 1/1961 | 211/20 |
| DE | 486431 A2 | * | 11/1991 | 211/19 |
| DK | 49270 | * | 9/1934 | 211/20 |
| GB | 2129387 | * | 5/1984 | 211/22 |
| NL | 41365 | * | 3/1937 | 211/20 |
| NL | 7806369 | * | 12/1979 | 211/20 |

* cited by examiner

*Primary Examiner*—Jennifer E. Novosad
(74) *Attorney, Agent, or Firm*—Olson & Hierl, Ltd.

(57) ABSTRACT

A rack for holding a bicycle by either its front or back wheel in an upright position on a floor. The rack includes a bracket which is adapted to be fitted on an elongate support frame. A rotatable lower brace extends outwardly from the bracket and includes spaced-apart arms which terminate in a downwardly extending lip. An upper brace extends generally upwardly from the bracket and includes spaced-apart arms. A bicycle is held on the rack by rolling the bicycle wheel directly into the lip of the lower brace and into and between the arms of the upper and lower braces respectively. A plurality of racks can be slidingly fitted onto a single support frame for holding a plurality of bicycles in spaced-apart relationship.

10 Claims, 4 Drawing Sheets

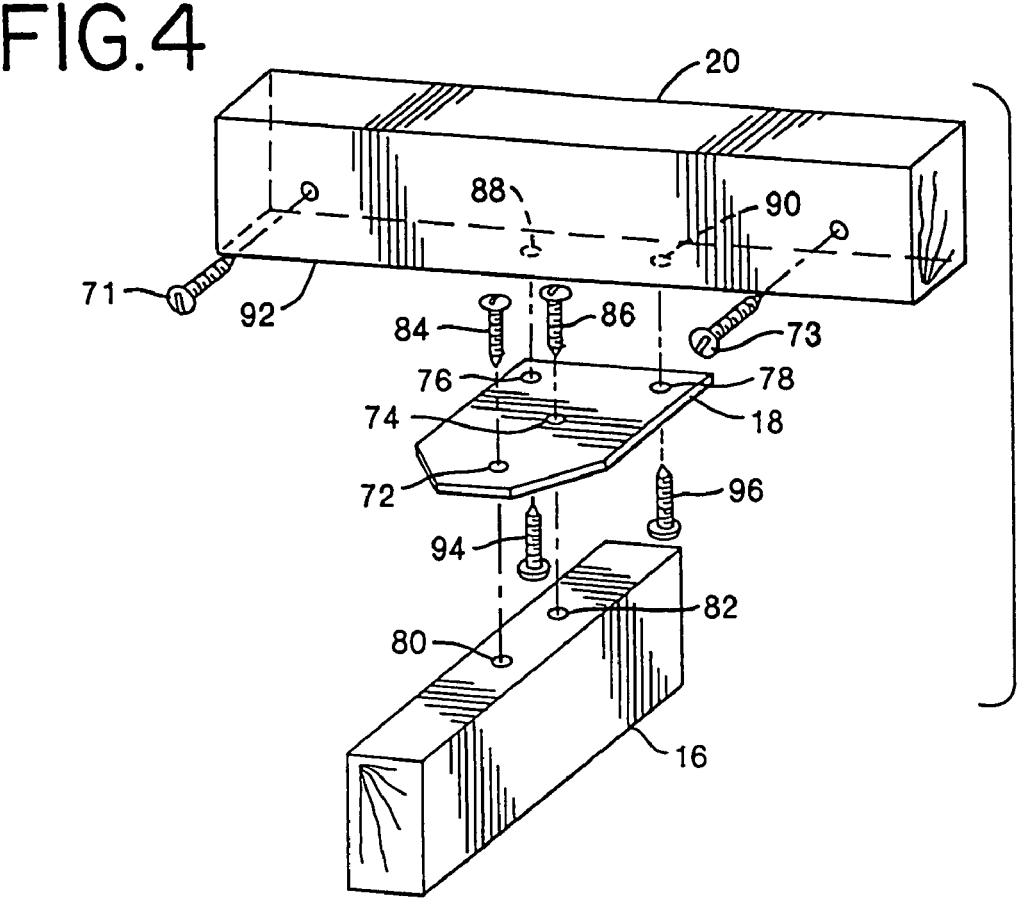
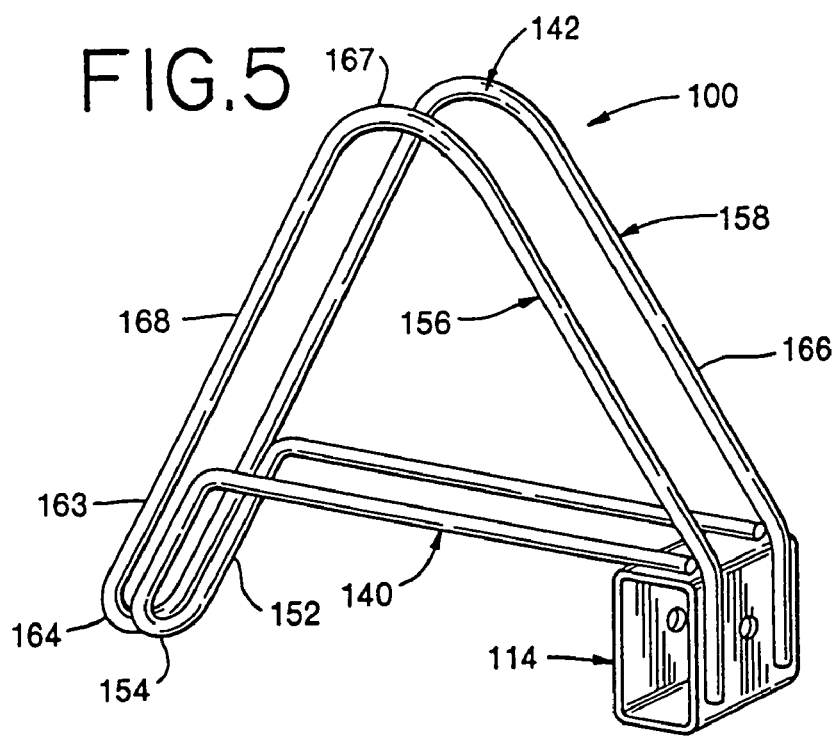

BICYCLE RACK

CROSS REFERENCE TO RELATED APPLICATION

This application is a division of U.S. application Ser. No. 09/450,961 filed on Nov. 30, 1999, now U.S. Pat. No. 6,588,603, which, in turn, is a continuation-in-part of U.S. application Ser. No. 08/905,302 filed on Aug. 1, 1997, now U.S. Pat. No. 5,992,645.

FIELD OF THE INVENTION

This invention relates to a bicycle rack and, more particularly, to a rack for holding a bicycle by its front or back wheel in an upright position on a support surface.

BACKGROUND OF THE INVENTION

Many types of racks and stands have been used for holding bicycles in a parked upright position. A commonly used stand for holding a bicycle in its normal upright position is the "kick stand", i.e., a bar swingably mounted to the frame of a bicycle. However, bicycles such as racing bicycles and mountain bicycles are not equipped with kick stands to reduce weight and increase performance. These bicycles are typically "parked" by either laying them flat on their sides or by resting them in an upright position against a wall or the like structure. These parking methods often result in damage to the bicycle as when, for example, a bicycle slides and falls away from the wall against which it has been rested.

Several types of stand-alone stands and racks have been used to hold and store such bicycles. However, a majority of these are bulky and heavy structures which require assembly and need to be permanently secured to the floor. These racks are generally made to hold numerous bicycles and are not adaptable for holding only one or two bicycles. What is needed is a bicycle rack that is relatively light weight and easy to use as by the average consumer in his or her garage. The rack should be easily adaptable to hold as many bicycles as desired.

The present invention provides an inexpensive, light weight, compact and portable bicycle rack which avoids the disadvantages of the various bicycle stands and racks in use today.

SUMMARY OF THE INVENTION

The present invention provides a rack adapted to be fitted on an elongate frame for holding a bicycle by its wheel in a upright position on a bicycle support surface such as a floor.

The bicycle rack includes a bracket which is adapted to be fitted on the elongate support frame. The rack includes a lower brace member which is coupled to and extends outwardly from the bracket and an upper brace member which is coupled to and extends upwardly from the bracket. The brace is adapted such that the wheel of the bicycle can be rolled along the bicycle support surface directly into the lower brace member for holding the bicycle in its upright position on the bicycle support surface.

In one embodiment, the bracket is a rectangularly shaped sleeve fitted onto an elongate rectangularly shaped support frame such as, for example, an elongate strip of wood, commonly referred to as a 2 by 4, which is seated on the bicycle support surface.

In one embodiment, the lower brace member is rotatable in a horizontal plane relative to the bracket includes a pair of spaced-apart arms which extend outwardly from the top face of the bracket and terminate in a downwardly extending generally U-shaped lip including a closed end adapted to abut the bicycle support surface.

The upper brace member includes a pair of spaced-apart arms which extend generally upwardly from the outer side face of the bracket and are in alignment with the arms respectively of the lower brace member. The upper brace member includes a proximal portion where the arms are bent inwardly at an acute angle relative to the bracket and a distal portion where the arms are bent outwardly at an obtuse angle relative to the proximal portion.

The present invention affords several advantages. Initially, the sleeve allows a rack or a plurality of racks to be quickly and easily slid onto an elongate 2 by 4 for holding one or a plurality of differently sized bicycles in spaced-apart relationship. The sleeve structure allows the rack to be used at public parks, schools or other venues such as bicycle races where several bicycles must be held in place. The sleeve structure allows such a multiple stand-alone rack embodiment to be quickly and easily disassembled and stored away. Moreover, the sleeve structure allows racks to be mounted on opposite sides of the 2 by 4 for holding bicycles on both sides of the 2 by 4.

Another advantage of the rack is the lip on the lower brace member which, unlike current racks, allows a bicycle to be rolled directly into the rack without lifting the bicycle.

An advantage of the upper brace member is that the proximal portion extends inwardly into the spoke area of the bicycle wheel and provides a convenient structure around which a bicycle lock can be extended to lock the bicycle to the rack. The outwardly extending distal portion of the upper frame member allows the wheel of the bicycle to be easily lifted upwardly away from the rack where it is preferable to lift the bicycle out of the rack as, for example, where the rack is used in a confined area where there is no room to roll the bicycle out of the rack.

Other features and advantages of the present invention will become readily apparent from the following detailed description, the appended drawings, and the accompanying claims.

BRIEF DESCRIPTION OF THE DRAWINGS

In the drawings,

FIG. 4 is an enlarged perspective exploded view of the structure and method for securing the support member to a garage wall or the like;

FIG. 5 is a perspective view of an alternate embodiment of the bicycle rack according to the present invention.

DESCRIPTION OF THE PREFERRED EMBODIMENTS

Figure 1:
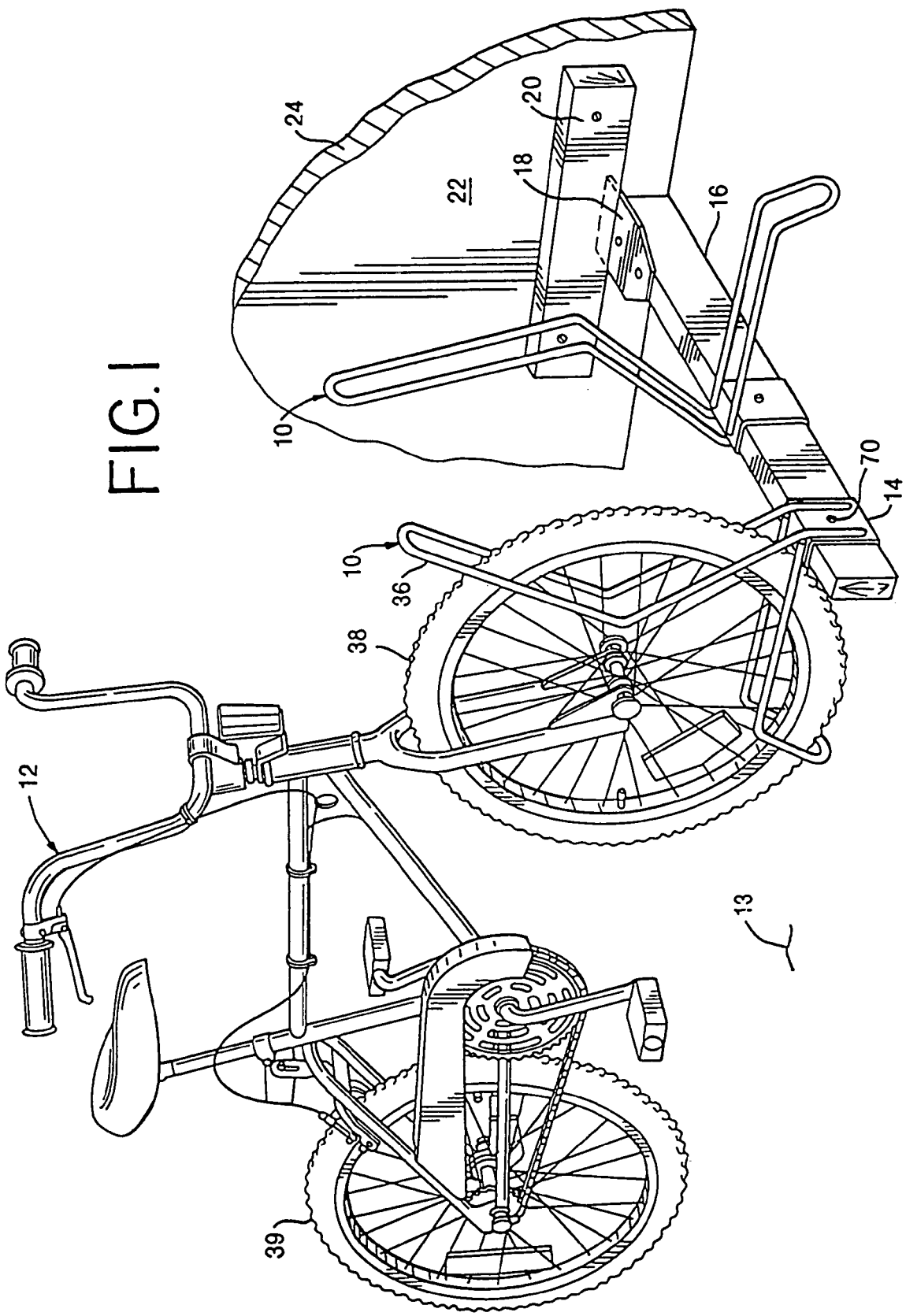
FIG. 1 is a perspective view of a pair of bicycle racks according to the invention fitted on an elongate support member which, in turn, is mounted to the side of a wall, one of the bicycle racks being shown with a bicycle held therein.

The invention disclosed herein is, of course, susceptible of embodiment in may different forms. Shown in the drawings and described hereinbelow in detail are preferred embodiments of the invention. It is to be understood, however, that the present disclosure is an exemplification of the principles of the invention and does not limit the invention to the illustrated embodiments.

For ease of description, a bicycle rack embodying the present invention is described as shown in the accompanying drawings where the rack is fitted on a support member which is seated on a generally horizontal support surface and terms such as upper, lower, horizontal, vertical, etc., will be used herein with reference to this position as shown in the drawings.

Figure 2:
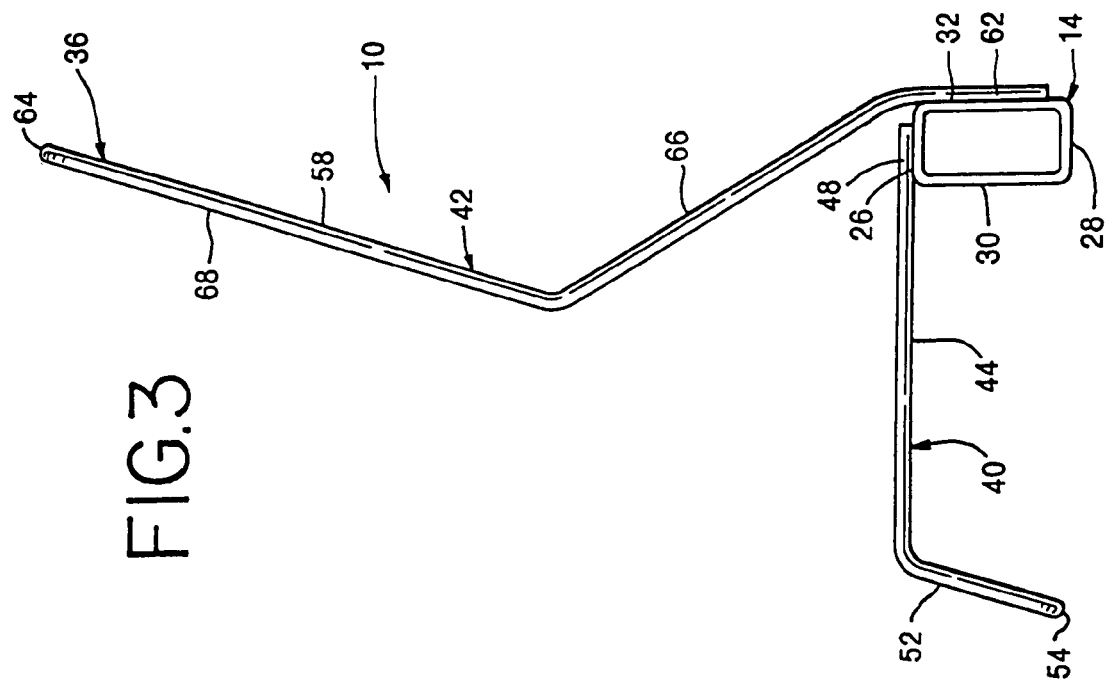
FIG. 2 is an enlarged perspective view of one of the bicycle racks shown in FIG. 1.
Figure 3:
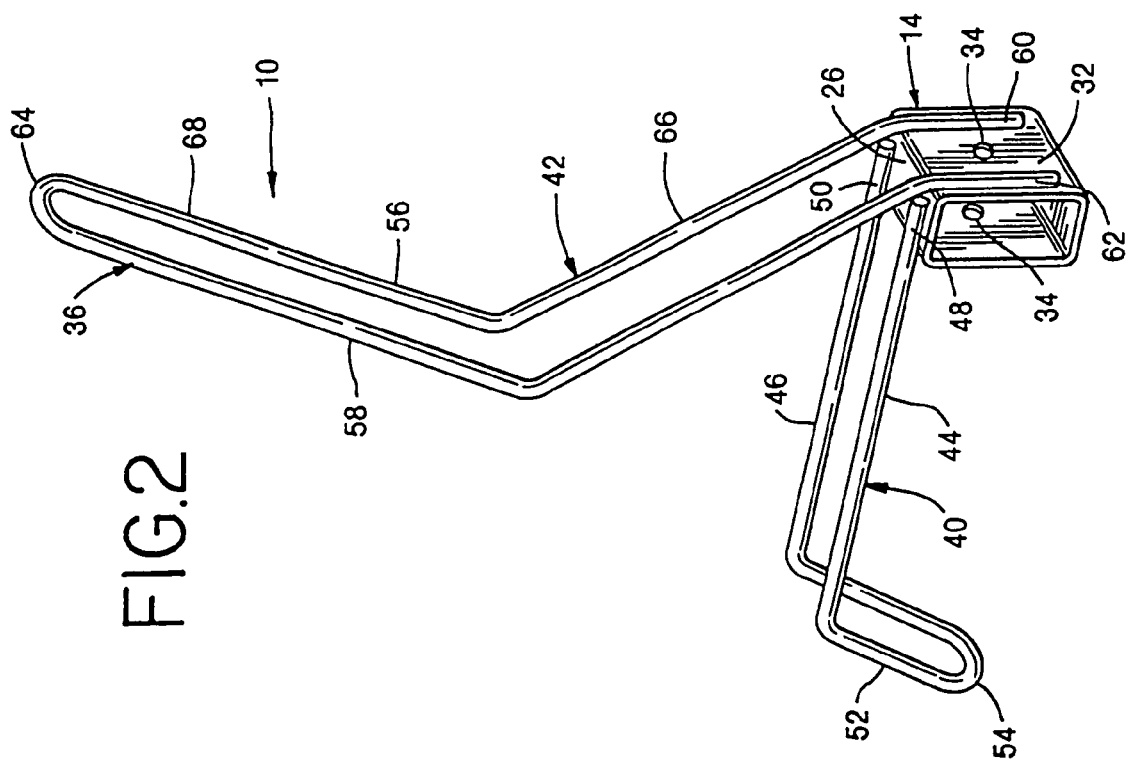
FIG. 3 is a side elevational view of the bicycle rack shown in FIG. 2.

Referring now to the drawings and more particularly, to FIGS. 1–3, there is shown therein a bicycle rack 10 constructed in accordance with the present invention for holding a bicycle 12 in an upright, parked position relative to a bicycle support surface such as the floor 13 of a garage or the like.

The rack 10 includes a bracket or hollow sleeve 14 which is slidingly fitted onto an elongate support member or frame 16 seated on the floor 13. A plate 18 secures the support member 16 to a support member 20 which, in turn, is secured to the outer face 22 of a wall 24 which may be a garage wall or the like.

In the embodiment shown, the bracket 14 is preferably made of metal, is generally rectangularly shaped, and is adapted to be fitted onto an elongate support member 16 which comprises an elongate rectangularly shaped strip of wood commonly referred to as a 2 by 4. The bracket 14 includes an upper or top face 26, a lower or bottom horizontal face 28 and vertical side faces 30 and 32. An aperture 34 preferably extends centrally through the side face 30 and the side face 32, respectively. The bracket 14 can be of any desired shape, such as circular, for fitting onto a tubular support member such as an elongate metal pipe or the like.

It is further understood that the structure of bracket 14 is not limited to a bracket which completely surrounds the support member but extends to any other type of suitable bracket or clamp structure.

The rack 10 includes a brace 36 which receives the front wheel 38 of the bicycle 12. Although FIG. 1 shows the rack receiving the bicycle's front wheel 28, it is understood that it can likewise receive the bicycle's back wheel 39. The brace 36 includes a lower brace member 40 and an upper brace member 42.

In the embodiment shown, the lower brace member 40 is a continuous elongate piece of 0.375 inch (0.937 cm.) diameter metal bar which, as shaped and molded, includes a pair of spaced-apart and horizontally co-planar arms 44 and 46 with proximal ends 48 and 50 respectively coupled to the top face 26 of the bracket 14 as by welding or the like. The arms 44 and 46 extend generally outwardly from the top face 26 of the bracket 14 in spaced and parallel relation to the floor 13. The arms 44 and 46 preferably terminate in a generally U-shaped lip 52 which extends unitarily downwardly from the arms 44 and 46 and includes a U-shaped closed end 54 which abuts the floor 13. In the embodiment shown, the lower brace member 40 is preferably made from a round solid metal bar stock and is approximately 16 inches (40 cm.) in length.

The upper brace member 42 can likewise be a continuous elongate piece of 0.375 inch (0.937 cm.) diameter metal bar which, as shaped and molded, includes a pair of spaced-apart and co-planar arms 56 and 58 with proximal ends 60 and 62 respectively coupled to the outer side face 32 of the bracket 14 as by welding or the like. The arms 56 and 58 extend generally upwardly from the bracket 14 and preferably terminate in a generally U-shaped closed end 64 unitary with the distal ends of the arms 56 and 58. As best shown in FIG. 3, the upper brace member 42 preferably includes a proximal portion 66 where the arms 56 and 58 are bent inwardly at an acute angle relative to the bracket 14 and a distal portion 68 unitary with the proximal portion 66 where the arms 56 and 58 are bent outwardly at an obtuse angle relative to the proximal portion 66. In the embodiment shown, the upper brace member 42 is also preferably made from a round solid metal bar stock, is approximately 21 inches (52 cm.) high, and the proximal portion 66 extends inwardly a distance approximately half the length of the lower brace member 40, i.e., approximately 7.375 inches (2.8 cm.).

The arms 44 and 46 of the lower brace member 40 and the arms 56 and 58 of the upper brace member 42 are in respective vertical co-planar alignment so that the bicycle wheel 38 can be received therein as shown in FIG. 1. More particularly, the bicycle 12 is rolled along the floor 13 towards the rack 10 and the wheel 38 is rolled directly over the closed end 54 and through the lip 52 of the lower brace member and into and between the arms 44 and 46 of the lower brace member 40 and the arms 56 and 58 of the upper brace member 42. To prevent the scratching of the bicycle wheel 38 upon entry or removal of the bicycle 12 from the rack 10, the brace arms 44, 46, 56 and 58 are preferably covered with a plastic or rubber outer layer. Alternatively, the brace arms 44, 46, 56 and 58 can be made of a molded or extruded plastic or rubber material.

According to the invention, the lip 52 allows the bicycle 12, and more particularly its front or back wheel, to be rolled directly into the lower brace 40 without any lifting of the bicycle 12 or the wheel 38. The inward inclination of the proximal portion 66 of the upper brace member 42 into the spoke area of the bicycle wheel 38 provides a convenient structure by which the bicycle 12 can be locked to the rack 10. Although not shown, it is understood that the bicycle 12 can be locked to the rack 10 by wrapping a chain or other type of bicycle lock through the spokes and around the proximal portion of the arms 56 and 58. The outwardly inclined distal portion 68 of the arms 56 and 58 allows the bicycle wheel 38 to be easily lifted upwardly away from the rack 10 where it is preferable to lift the bicycle 12 out of the rack as, for example, where the rack 10 is used in a confined area where there is no room to roll the bicycle 12 out of the rack 10.

The bracket 14 allows a plurality of racks 10 (two of which are shown in FIG. 1) to be easily and quickly slid onto the elongate support member 16 and spaced according to either the type and size of the bicycles being held, or the member of bicycles to be held along the support member 16. The racks 10 may be positioned on opposite sides of the support member 16 as shown in FIG. 1 or, alternatively, on the same side depending upon the amount of available space in the area surrounding the support member 16.

Once the racks 10 have been appropriately spaced from each other on the support member 16, a fastener such as a screw 70 (FIG. 1) or the like is extended through the aperture 34 in the bracket 14 and into the body of the support member 16 to releasably secure the rack 10 to the support member 16. Although not shown, it is understood that the fastener 70 could be substituted with a quick lock/release structure.

Although FIG. 1 depicts an embodiment of the present invention where the support member 16 is secured to a wall 24, it is understood that the support member 16 is usable as a stand-alone support structure. For example, the invention encompasses a stand-alone multiple rack embodiment where as many as fifteen of the racks 10 are slid onto and spaced along a support member 16 which is at least thirty feet or more in length for use at public parks, schools or other venues such as a bicycle races where more than fifty bicycles may need to be held in place. The bracket structure allows such a multiple stand-alone rack embodiment to be quickly and easily assembled, disassembled and stored away.

FIGS. 1 and 4 depict the method by which the support member 16 is secured to the wall 24. Initially, support member 20 is positioned against the wall 24 in spaced and parallel relation to the floor 13. Screws 71 and 73 secure the member 20 to the wall 24. Plate 18 includes apertures 72, 74, 76 and 78 and is positioned on the top of the support member 16 such that apertures 72 and 74 are placed in alignment with apertures 80 and 82 respectively in the top of the support member 16. The plate 18 is secured to the support member 16 by a pair of fasteners, such as screws 84 and 86, which extend respectively through the apertures 72 and 74 in the plate 18 and the apertures 80 and 82 in the support member 16. A distal portion of the plate 18 extends over the distal butt end of the support member 16 to allow the plate 18 to be secured to the underside of the support member 20. In particular, the plate 18 is secured to the support member 20 by aligning the apertures 76 and 78 in the plate 18 with apertures 88 and 90 respectively in the lower surface 92 of the support member 20. Fasteners, such as screws 94 and 96, are extended respectively through the apertures 76 and 78 in plate 18 and then through the apertures 88 and 90 in the support member 20 thereby securing the support member 16 to the support member 20.

FIG. 5 depicts an alternate rack embodiment 100 including a bracket 114 and a lower brace member 140 similar in structure respectively to the bracket 14 and the lower brace member 40 of the rack 10.

The upper brace member 142 of rack 100 differs in structure from the upper brace member 42 of the rack 10 in that the upper brace member 142 includes a pair of spaced apart, co-planar arms 156 and 158 which are shaped in the form of an inverted V. In particular, the upper brace member 142 includes a proximal portion 166 where the arms 156 and 158 are bent inwardly at an acute angle relative to the bracket 114, an apex 167, and a distal portion 168 where the arms 156 and 158 are bent downwardly at an acute angle relative to the proximal portion 166. The arms 156 and 158 terminate in a generally U-shaped lip 163 including a U-shaped closed end 164 which respectively abut against the lip 152 and the closed end 154 of the lower brace member 140.

Although not shown, it is understood that a bicycle is rolled directly over the closed ends 164 and 154 and through the lips 163 and 152 respectively of the upper and lower brace members 142 and 140 and into and between the respective arms thereof for holding a bicycle in an upright position.

The inverted V structure of the upper brace member 142 provides a convenient arm structure around which a bicycle lock can be wrapped to secure the bicycle to the rack.

Figure 6:
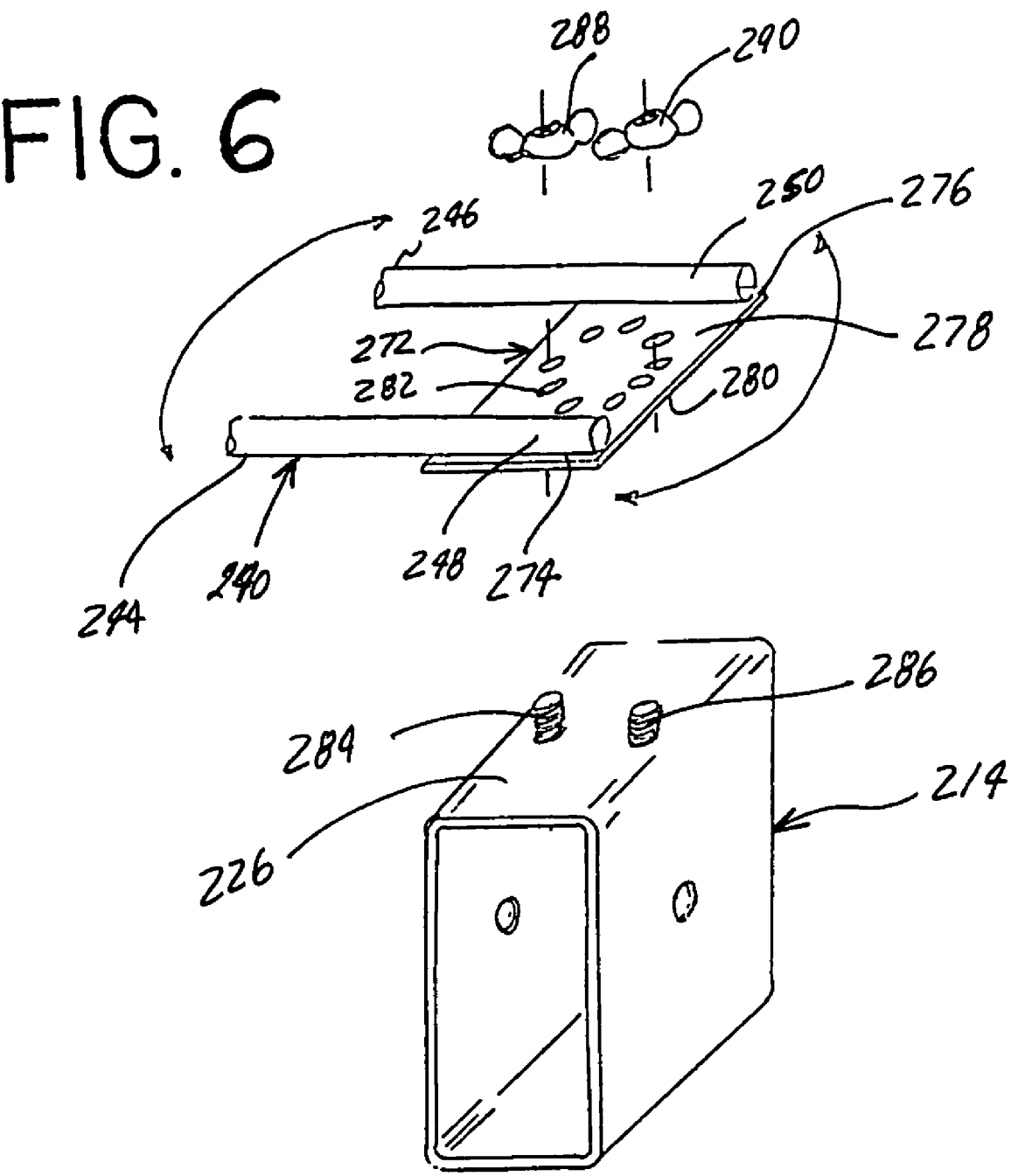
FIG. 6 is an enlarged broken, exploded perspective view of an alternate embodiment of the lower brace member and bracket of the bicycle rack according to the present invention.

FIG. 6 is a broken perspective view of an alternate embodiment of the rack of the present invention including a lower brace member 240 which is similar in structure to the lower brace member 40 of the rack 10 depicted in FIGS. 2 and 3 except that a flat plate 272, which can be made of steel or the like material, is secured as by welding or the like to the underside of the proximal ends 248 and 250 of the spaced-apart and horizontally co-planar arms 244 and 246. The plate 272 extends between the arms 244 and 246 and particularly includes a first longitudinal side edge 274 secured to the underside of the proximal end 248 of the arm 244 and an opposed second longitudinal side edge 276 secured to the underside of the proximal end 250 of the arm 246. The plate 272 includes an upper face 278 to which the arms 244 and 246 are secured and a lower face 280. The plate 272 further includes a plurality of apertures 282 which extend through the top and bottom faces 278 and 280 and are arranged on the plate 272 in a spaced-apart, circular relationship. The apertures 282 are located between the respective side edges 274 and 276 of the plate 272 between the respective arms 244 and 246 of the brace member 240.

The bracket 214 is similar in structure to the bracket 14 of the rack 10 depicted in FIGS. 2 and 3 except that the bracket 214 includes two studs or screws or the like fasteners 284 and 286 respectively which are secured to and extend outwardly from the top face 226 thereof. In the embodiment shown, the studs 284 and 286 are spaced apart from each other and centrally disposed on the face 226.

The use of a plate 272 and studs 284 and 286 in accordance with this alternate embodiment allows the lower brace member 240 to be removably secured to the bracket 214. Additionally, the circular arrangement of the apertures 282 in the plate 272 advantageously allows the lower brace member 240 to be swivelled or rotated either clockwise or counterclockwise in a horizontal plane relative to the bracket 214 and secured thereto in a relationship relative to the bracket 214 other than the perpendicular relationship depicted in FIGS. 2 and 3.

In accordance with this embodiment, the studs 284 and 286 are spaced apart from each other so as to allow the same to extend through two of the corresponding diametrically opposed apertures 282 in the plate 272 when the lower face 280 of the plate 272 is brought into abutting relationship with the top face 226 of the bracket 214. A pair of wing nuts 288 and 290 are fastened to the studs 284 and 286 respectively to secure the brace member 240 to the bracket 214. The two corresponding diametrically opposed apertures 284 selected by the user determine the angle at which the brace member 240 will be oriented and positioned relative to the bracket 214.

The foregoing specification and drawings are to be taken as illustrative but not limiting of the present invention. Still other rack configurations and embodiments utilizing the spirit and scope of the present invention are possible, and will readily present themselves to those skilled in the art.

I claim:

1. A bicycle rack adapted to be fitted on an elongate support frame for holding a bicycle by its wheel in an upright position on a bicycle support surface, the rack comprising:

a bracket adapted to be fitted on the elongate support frame;

a brace including a lower brace member coupled to and extending outwardly from said bracket and an upper brace member coupled to and extending upwardly from said bracket;

said upper brace member defining an opening for receiving a first portion of the bicycle wheel;

said lower brace member defining an opening for receiving a second portion of the bicycle wheel; and wherein said lower brace member includes a pair of spaced-apart arms terminating in a downwardly extending generally U-shaped lip including a closed end adapted to abut the bicycle support surface and being adapted such that a bicycle wheel can be rolled over said closed end of said lip and between said arms.

2. A bicycle rack adapted to be fitted on an elongate support frame for holding a bicycle by its wheel in an upright position on a bicycle support surface, the rack comprising:

a bracket adapted to be fitted on the elongate support frame;

a brace including a lower brace member coupled to and extending outwardly from said bracket and an upper brace member coupled to and extending upwardly from said bracket;

said upper brace member defining an opening for receiving a first portion of the bicycle wheel;

said lower brace member defining an opening for receiving second portion of the bicycle wheel; and wherein said upper brace member includes a pair of spaced-apart arms.

3. The bicycle rack of claim 2 wherein said upper brace member includes a proximal portion where said arms are bent inwardly at an acute angle relative to said bracket and a distal portion unitary with said proximal portion where said arms are bent outwardly at an obtuse angle relative to said proximal portion.

4. A bicycle rack adapted to be fitted on an elongate support frame for holding a bicycle by its wheel in an upright position on a bicycle support surface, the rack comprising:

a bracket adapted to be fitted on the elongate support frame;

a brace including a lower brace member coupled to and extending outwardly from said bracket and terminating in a lip, and an upper brace m extending upwardly from said bracket, said brace being adapted such that the wheel of the bicycle can be rolled along the bicycle support surface directly into said lower brace member for holding the bicycle in an upright position on the bicycle support surface; and wherein said upper brace member includes a pair of spaced-apart arms coupled to and extending generally upwardly from said bracket, said upper brace member including a proximal portion where said arms are bent inwardly at an acute angle relative to said support frame and a distal portion unitary with said proximal portion where said arms are bent downwardly at an acute angle relative to said proximal portion, said arms terminating in a generally U-shaped lip which abuts the lip of said lower brace member, the bicycle wheel being rolled through the lips of said upper and lower brace members and between said arms of said upper brace member.

5. The bicycle rack of claim 4 further comprising a fastener extending through said bracket and into the support frame, releasably securing said bicycle rack to the support frame.

6. A rack for holding a bicycle by its front or back wheel in an upright position on a floor and adapted to be fitted on an elongate support frame seated on the floor, the rack comprising:

a hollow sleeve adapted to be fitted on the elongate support frame seated on the floor, said sleeve including a top face and an outer face;

a lower brace including a pair of spaced-apart arms including proximal ends coupled to and extending generally outwardly from said sleeve in spaced relation to the floor and terminating in a downwardly extending lip including a closed end adapted to abut the floor, the lower brace being rotatable along a horizontal plane relative to the bracket; and an upper brace including a pair of spaced-apart arms in alignment with the pair of arms respectively of said lower brace, said arms of said upper brace including proximal ends coupled to the outer face of said sleeve and extending generally upwardly from said sleeve and terminating in a closed end such that the front or back wheel of the bicycle can be rolled along the floor directly through said lip of said lower brace and received between said arms of said lower brace and said upper brace respectively for holding the bicycle in an upright position relative to the floor.

7. The rack of claim 6 wherein said upper brace includes a proximal portion where said arms extend inwardly at an acute angle relative to said sleeve and a unitary distal portion where said arms of said upper brace extend outwardly at an obtuse angle relative to said proximal portion.

8. The rack of claim 6 wherein said sleeve is rectangularly shaped.

9. The rack of claim 6 wherein the lower brace member is rotatable along a horizontal plane relative to the bracket.

10. A bicycle rack adapted to be fitted on an elongate support frame for holding a bicycle by its wheel in an upright position on a bicycle support surface, the rack comprising:

a bracket adapted to be fitted on the elongate support frame;

a brace including a lower brace member coupled to and extending outwardly from said bracket and an upper brace member coupled to and extending upwardly from said bracket;

said upper brace member defining an opening for receiving a first portion of the bicycle wheel;

said lower brace member defining an opening for receiving a second portion of the bicycle wheel; and wherein:

the bicycle wheel has a center; and said upper brace member comprises a first part extending toward the center of the bicycle wheel and a second part extending away from the center of the bicycle wheel, with the first and the second parts cooperating to define an opening for receiving the first portion of the bicycle wheel.

* * * * *

UNITED STATES PATENT AND TRADEMARK OFFICE
CERTIFICATE OF CORRECTION

PATENT NO. : 7,055,700 B2  Page 1 of 1
APPLICATION NO. : 10/615447
DATED : June 6, 2006
INVENTOR(S) : Kent G. West It is certified that error appears in the above-identified patent and that said Letters Patent is hereby corrected as shown below:

<u>Column 7</u>,
Line 18, before "second" insert -- a --.
Lines 34-35, "terminiating" should be -- terminating --.
Line 35, "m" should be -- member coupled to and --.

Signed and Sealed this

Twentieth Day of May, 2008

JON W. DUDAS
*Director of the United States Patent and Trademark Office*